(No Model.)
T. A. JEBB.
PROCESS OF AND APPARATUS FOR RECOVERING STARCH AND OTHER VALUABLE SUBSTANCES FROM WASTE WATER IN THE MANUFACTURE OF STARCH, &c.
No. 270,439. Patented Jan. 9, 1883.
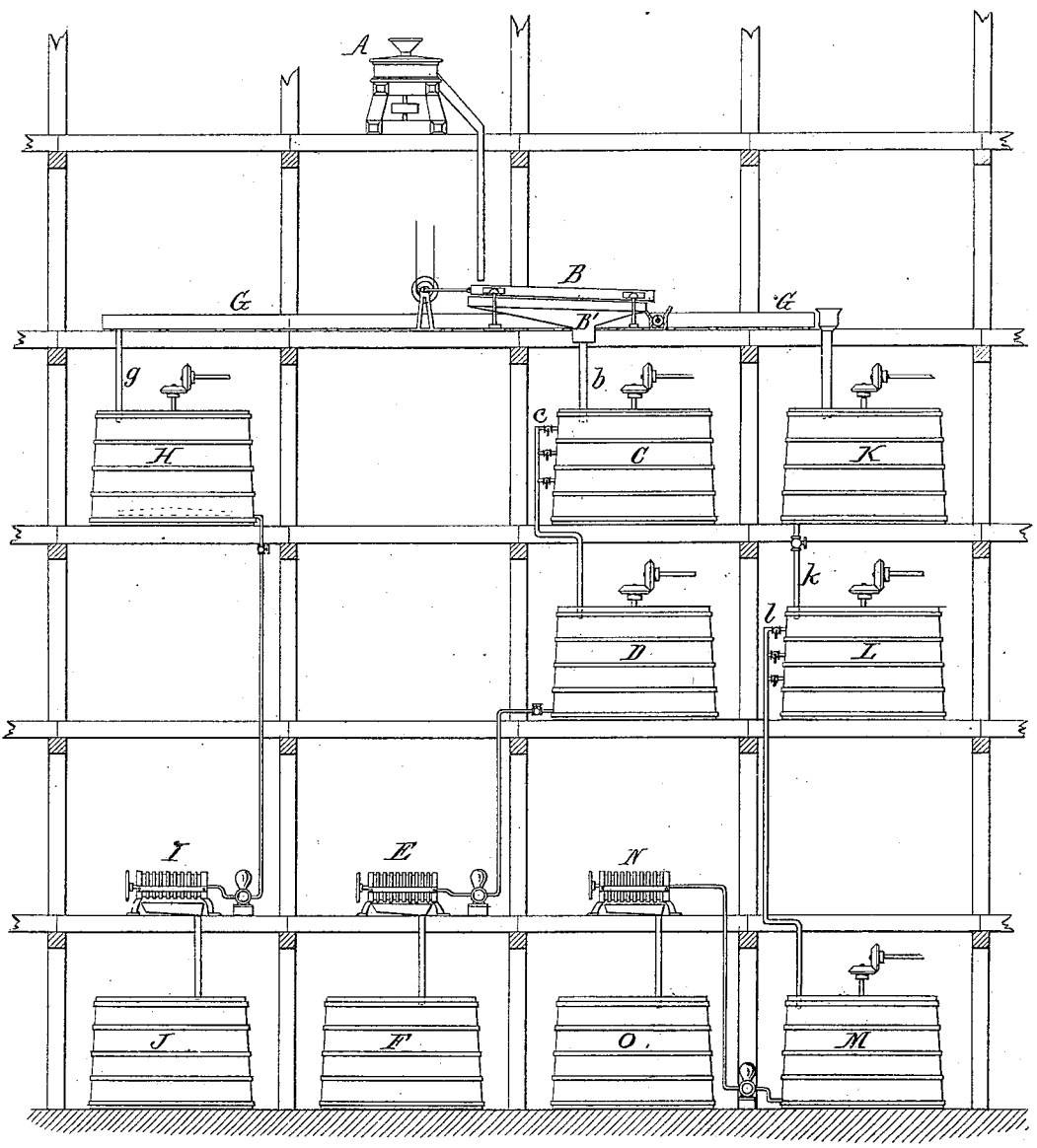

UNITED STATES PATENT OFFICE.

THOMAS A. JEBB, OF BUFFALO, NEW YORK.

PROCESS OF AND APPARATUS FOR RECOVERING STARCH AND OTHER VALUABLE SUBSTANCES FROM WASTE WATER IN THE MANUFACTURE OF STARCH, &c.

SPECIFICATION forming part of Letters Patent No. 270,439, dated January 9, 1883.

Application filed August 29, 1882. (No model.)

*To all whom it may concern:*

Be it known that I, THOMAS A. JEBB, of the city of Buffalo, in the county of Erie and State of New York, have invented a new and useful Improvement in Apparatus for Recovering the Starch and other Valuable Substances from the Waste Water in the Manufacture of Starch, &c., of which the following is a specification.

This invention relates to improvements in the art of obtaining starch from grain and other substances, and has for its object to recover and collect the valuable portions which are contained in the water in which the grain or other substance, or the products derived from the grain or other substance, are treated in obtaining the starch therefrom.

My invention consists in the peculiar means employed for recovering the valuable portions from the waste water, as will be hereinafter fully described, and pointed out in the claims.

The accompanying drawing represents an elevation of the apparatus which is employed for carrying out my invention.

A represents a mill or other suitable apparatus, whereby the grain or other substance from which the starch is to be obtained is reduced to the proper degree of fineness.

B represents a separating-machine of any suitable and well-known construction, whereby the crude starch contained in the ground material is separated from the coarse offal. This separating-machine consists preferably of a flat vibrating sieve covered with bolting-cloth, upon which water-sprays are delivered, whereby the crude starch is washed through the meshes of the sieve, while the coarse offal escapes over the tail of the sieve. Revolving bolts or reels, or any other suitable separating-machine, may, however, be employed, if desired. The starch milk or liquid containing the crude starch passes from the sieve into a receptacle, B', and thence through a pipe, *b*, into a receiving or settling tank, C, which is provided with a rotating stirrer or other suitable agitating device. The starch-milk is permitted to come to a state of rest in the tank C, whereby the starch is caused to settle on the bottom of the tank. When all the starch has been so deposited in the tank as far as is practicable the water standing above the deposited starch in the tank is drawn off into a receiving-tank, D, through a series of cocks, *c*, arranged at different heights on the receiving-tank C. The water is pumped from the tank D through a press-filter, E, which is provided with suitable filter-cloths, whereby the starch and other solid particles contained in the water are arrested, while the clear water escapes from the filter and is collected in a receiving-tank, F. This press-filter may be of any suitable and well-known construction; but I prefer a filter composed of a series of grooved plates which are detachably connected together, and which are covered with filter-cloth, such filters being well known for filtering or separating the solid impurities from saccharine solutions in the manufacture of cane and grape sugar. The solid particles contained in this water, consisting principally of starch, are deposited upon the filter-cloths between the filter-plates, and the operation of filtering is continued until the spaces between the filter-plates are nearly filled, when the supply of liquid is shut off from the filter and the plates are taken apart and the accumulated solid matter is removed.

This solid matter, which, as before stated, consists principally of starch, may be worked up with the starch deposited on the tables or in the settling-vats, or it may be worked up separately, if preferred. The water collected in the tank F, which has been so deprived of the solid particles, may be used over again in the various steps of the manufacture, as it is substantially free from impurities. A suitable receptacle may be arranged under each filter to receive the solid material from the filters when the filter-plates are taken apart. The starch deposited in the tank C is mixed with fresh water after the water standing above the deposited starch has been drawn off, as above described, and a small quantity of alkali is added at the same time and intimately mixed with the starch by the rotating stirrer with which the tank C is provided. The liquid resulting from this operation is conducted to the inclined starch-tables or depositing-troughs G, which may be of any ordinary and well-known construction, and upon which the starch is deposited in a comparatively pure state, while the water, gluten, and other light refuse escapes at the tail end of these tables. The refuse material which so escapes from the starch-tables is conducted by a pipe, $g$, to a receiving-tank, H, which is provided with a suitable stirrer. From this tank the refuse matter is pumped to a press-filter, I, constructed like the filter E, hereinbefore referred to. The solid refuse, consisting principally of gluten with some starch, albumenoids, and woody fiber, is intercepted by the filter-cloth and remains in the spaces between the filter-plates, while the clear water escapes from the filter and is collected in a receiving-tank, J. When the accumulation of the solid material in the filter I renders the further use of the filter impracticable the filter-plates are taken apart and the solid material is removed. The gluten predominates in this solid material, and it may be used for food for animals, or be worked up into size, or into a fertilizing material, as may be preferred. The starch deposited on the tables G is placed into a washing-tub or breaking-tank, K, in which it is mixed with fresh water, and from which it passes by a pipe, $k$, into a settling-tank, L. In the latter the liquid is permitted to come to a state of rest, whereby the starch is deposited. The water standing above the deposited starch is drawn off into a receiving-tank, M, through a series of cocks and pipes, $l$, arranged one above the other in the tank L. From the tank L the liquid is pumped through a press-filter, N, constructed like the filters E and I. The solid particles contained in the liquid remain between the plates of the filter N, while the clear water escapes from the filter and is collected in a receiving-tank, O. The solid material which collects between the plates of the filter N is removed from time to time in order to retain the filter in an operative condition. This solid material, consisting principally of starch with a slight mixture of gluten, albumenoids, and woody fiber, may be worked up separately or with the main body of starch, as may be preferred.

The water collected in the tanks J and O may be used over again in those steps of the manufacture in which the presence of a trace of alkali is not objectionable.

The starch obtained from the grain or other substance is further treated in any well-known or suitable manner, according to the ultimate product desired to be manufactured, whether commercial starch, grape-sugar, glucose, beer, spirits, or the like.

It is obvious from the foregoing that all the solid particles contained in the waste water derived from the various steps of the manufacture are recovered and collected in a condition in which they may be further treated and worked up into useful products, whereby a considerable saving of material is effected and the quantity of water required for the manufacture largely reduced.

The filters, tanks, and other vessels or apparatus should be provided in such numbers that empty filters, tanks, and other vessels are always ready to receive the material to be treated while the filled filters, tanks, or other vessels are being emptied, so that the manufacture can be carried on without interruption.

I claim as my invention—

1. The combination, with the starch-settling tank C, of a pipe or conduit through which the liquid is drawn from said tank, and a pressure-filter, E, through which said liquid is forced, substantially as set forth.

2. The combination, with starch-depositors G, of a pipe or conduit through which the liquid refuse escapes from said depositors, and a press-filter, I, through which said liquid refuse is forced, substantially as set forth.

3. The combination, with the starch-breaking tank K and starch-depositing tank L, of a conduit or pipe through which the liquid is drawn from the tank L, and a pressure-filter, N, through which said liquid is forced, substantially as set forth.

T. A. JEBB.

Witnesses:
JNO. J. BONNER,
CHAS. F. GEYER.